(12) United States Patent
Berjot et al.

(10) Patent No.: US 11,975,857 B2
(45) Date of Patent: May 7, 2024

(54) FRONT ENGINE ATTACHMENT SYSTEM FOR AN AIRCRAFT ENGINE, WHICH HAS A COMPACT STRUCTURE

(71) Applicant: Airbus Operations SAS, Toulouse (FR)

(72) Inventors: Michael Berjot, Toulouse (FR); Thomas Robiglio, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/899,673

(22) Filed: Aug. 31, 2022

(65) Prior Publication Data
US 2023/0072158 A1    Mar. 9, 2023

(30) Foreign Application Priority Data

Sep. 3, 2021  (FR) ...................................... 2109209

(51) Int. Cl.
*B64D 27/40*     (2024.01)
*F02C 7/20*      (2006.01)

(52) U.S. Cl.
CPC ................ *B64D 27/40* (2024.01); *F02C 7/20* (2013.01)

(58) Field of Classification Search
CPC .................. B64D 27/26; B64D 2027/262–268
See application file for complete search history.

(56) References Cited

U.S. PATENT DOCUMENTS

| 6,398,161 | B1* | 6/2002 | Jule ........................ | B64D 27/18 244/54 |
| 2008/0223983 | A1* | 9/2008 | Lafont ................... | B64D 27/26 244/54 |
| 2008/0230675 | A1* | 9/2008 | Audart-Noel ......... | B64D 27/26 244/54 |
| 2008/0272229 | A1* | 11/2008 | Lafont ................... | B64D 27/26 244/54 |
| 2009/0032673 | A1* | 2/2009 | Dron ..................... | B64D 27/26 248/557 |

(Continued)

FOREIGN PATENT DOCUMENTS

| EP | 3750811 A1 | 12/2020 |
| FR | 3096353 A1 | 11/2020 |

(Continued)

OTHER PUBLICATIONS

French Search Report; priority document.

*Primary Examiner* — Todd E Manahan
*Assistant Examiner* — Marc J Amar
(74) *Attorney, Agent, or Firm* — Greer, Burns & Crain, Ltd.

(57) ABSTRACT

A front engine attachment system having an engine pylon having a frontal rib fastened against a front face, a front engine attachment having a beam fastened to the frontal rib, two rods articulated to the beam respectively via two connection points and one connection point, and a front casing of an engine, wherein the first rod is articulated to the front casing via a connection point and wherein the second rod is articulated to the front casing via a connection point, wherein each point of connection of a rod to the beam is positioned inside a volume that extends the front face of the engine pylon towards the front. Such a front engine attachment system has reduced bulk and therefore less drag.

4 Claims, 5 Drawing Sheets

(56) References Cited

U.S. PATENT DOCUMENTS

| | | | | |
|---|---|---|---|---|
| 2011/0127368 | A1* | 6/2011 | Penda | B64D 27/20 |
| | | | | 244/54 |
| 2012/0080554 | A1* | 4/2012 | Lafont | B64D 27/18 |
| | | | | 244/54 |
| 2014/0061426 | A1* | 3/2014 | Zheng | B64D 27/26 |
| | | | | 248/554 |
| 2019/0135445 | A1* | 5/2019 | Combes | B64D 27/26 |
| 2020/0207481 | A1* | 7/2020 | Combes | B64D 27/26 |
| 2020/0216184 | A1* | 7/2020 | Puech | B64D 27/26 |
| 2020/0298986 | A1* | 9/2020 | Cayssials | B64D 27/26 |
| 2020/0369395 | A1 | 11/2020 | Deforet et al. | |
| 2020/0385132 | A1* | 12/2020 | Deforet | B64D 27/26 |

FOREIGN PATENT DOCUMENTS

| | | | | | |
|---|---|---|---|---|---|
| FR | 3103465 | A1 * | 5/2021 | | B64D 27/18 |
| WO | 2021104913 | A1 | 6/2021 | | |

* cited by examiner

FRONT ENGINE ATTACHMENT SYSTEM FOR AN AIRCRAFT ENGINE, WHICH HAS A COMPACT STRUCTURE

CROSS-REFERENCES TO RELATED APPLICATIONS

This application claims the benefit of the French patent application No. 2109209 filed on Sep. 3, 2021, the entire disclosures of which are incorporated herein by way of reference.

FIELD OF THE INVENTION

The present invention relates to a front engine attachment system for an aircraft engine, and to an aircraft having at least one such front engine attachment.

BACKGROUND OF THE INVENTION

An aircraft conventionally has at least one engine, in particular, a jet engine. Beneath each wing, and for each engine, the aircraft has an engine pylon that is fastened to the structure of the wing and that extends below the wing, and the engine is suspended beneath the engine pylon.

The engine is fastened to the engine pylon by way of an engine attachment system comprising a front engine attachment and a rear engine attachment.

FIG. 6 shows a front engine attachment 600 of the prior art that has a beam 602 fastened to a front face of the engine pylon and two rods 604a-b fastened between a clevis of the beam 602 and a clevis of a front casing 606 of the engine via ball joint connections.

The engine pylon takes the form of a box having a frontal rib 608 to which the beam 602 is fastened by fastening bolts 610 that grip the frontal rib 608 and the beam 602.

With this arrangement, the points of connection of the rods 604a-b to the beam 602 are disposed on the sides of the engine pylon and of the frontal rib 608, and this generates a relatively substantial occupied volume. As a result of this substantial volume, the cowl that surrounds the front engine attachment 600 also has large dimensions generating significant drag.

Although such a front engine attachment is satisfactory from the point of view of its use, it is necessary to find a different architecture that makes it possible to obtain a front engine attachment that is less bulky allowing optimization of the aerodynamic surface.

SUMMARY OF THE INVENTION

An object of the present invention is to propose a front engine attachment system of which the connection points of the rods are situated in a restricted space delimited by the projection of the frontal face of the engine pylon.

To this end, a front engine attachment system for an engine of an aircraft is proposed, the front engine attachment system having:
  an engine pylon having a front face and a frontal rib fastened against the front face,
  a front engine attachment having a beam fastened to the front of the frontal rib, a first rod fastened in an articulated manner to the beam via two connection points and a second rod fastened in an articulated manner to the beam via one connection point, and
  a front casing of the engine, wherein the first rod is fastened in an articulated manner to the front casing via a connection point and wherein the second rod is fastened in an articulated manner to the front casing via a connection point,
  wherein each point of connection of a rod to the beam is positioned inside a volume that extends the front face of the engine pylon towards the front.

Such a front engine attachment system has reduced bulk and therefore less drag.

Advantageously, for each point of connection of a rod to the beam, the latter has a female clevis in which the rod is positioned.

Advantageously, the beam is made up of a main plate, a secondary plate parallel to the main plate and a block forming a spacer between the main plate and the secondary plate, the main plate is pressed against the frontal rib, and, for each female clevis of the beam, one of the walls of said female clevis is realized by the main plate and the other wall of said female clevis is realized by the secondary plate.

The invention also proposes an aircraft having a structure, an engine and a front engine attachment system according to one of the preceding variants, wherein the engine pylon is fastened to the structure, and wherein the front casing is as one with the engine.

BRIEF DESCRIPTION OF THE DRAWINGS

The abovementioned features of the invention, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
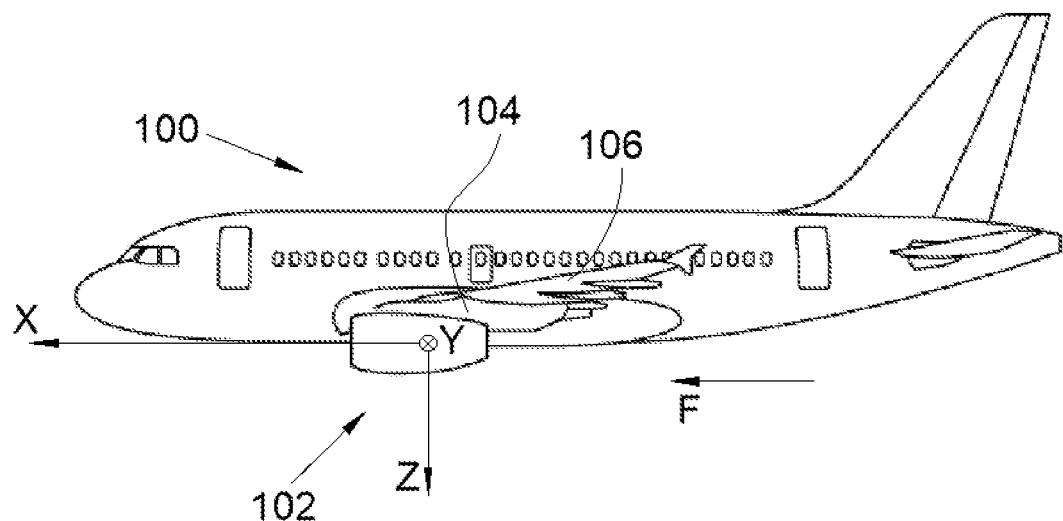
FIG. 1 is a side view of an aircraft according to the invention.

In the following description, terms relating to a position are considered in relation to an aircraft in a position of forward movement, i.e., as shown in FIG. 1, in which the arrow F represents the direction of forward movement.

FIG. 1 shows an aircraft 100 that has an engine 102, in particular a jet engine that is fastened beneath an engine pylon 104 that is itself fastened beneath a wing 106.

In the following description, and by convention, the X direction is the longitudinal direction of the engine 102, with positive orientation in the direction of forward movement of the aircraft 100, the Y direction is the transverse direction of the engine 102, which is horizontal when the aircraft 100 is on the ground, and the Z direction is the vertical direction or vertical height when the aircraft 100 is on the ground, these three directions X, Y and Z being mutually orthogonal.

The engine 102 has a general shape exhibiting symmetry of revolution about the longitudinal axis X.

In the embodiment of the invention that is shown in FIG. 1, the aircraft 100 has an engine 102 beneath each wing 106 of the aircraft 100, but it is possible to provide a plurality of engines beneath each wing 106.

Figure 2:
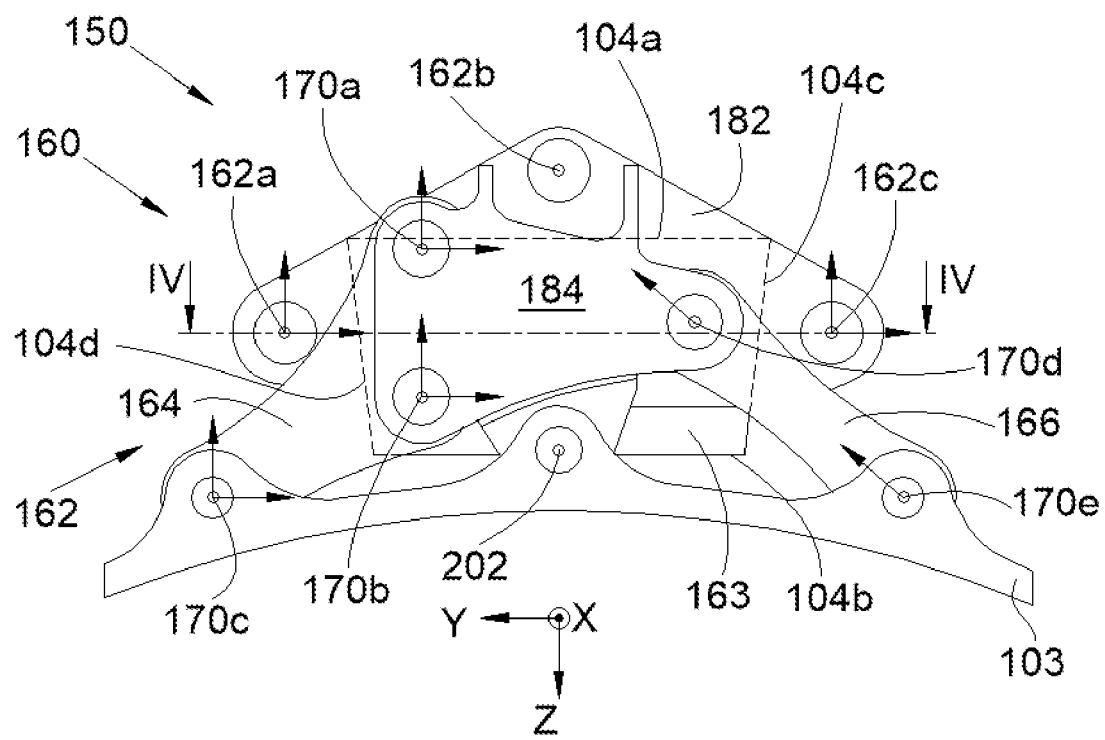
FIG. 2 is a front view of a front engine attachment system according to the invention.
Figure 3:
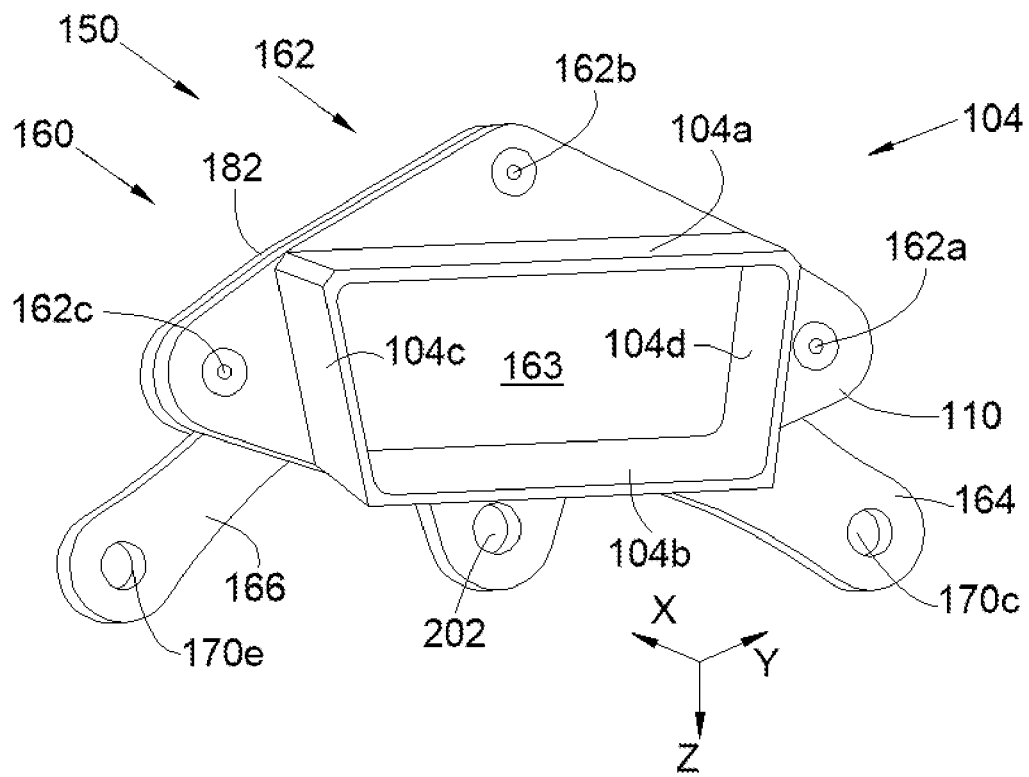
FIG. 3 is a perspective view from behind of the engine attachment system in FIG. 2.
Figure 4:
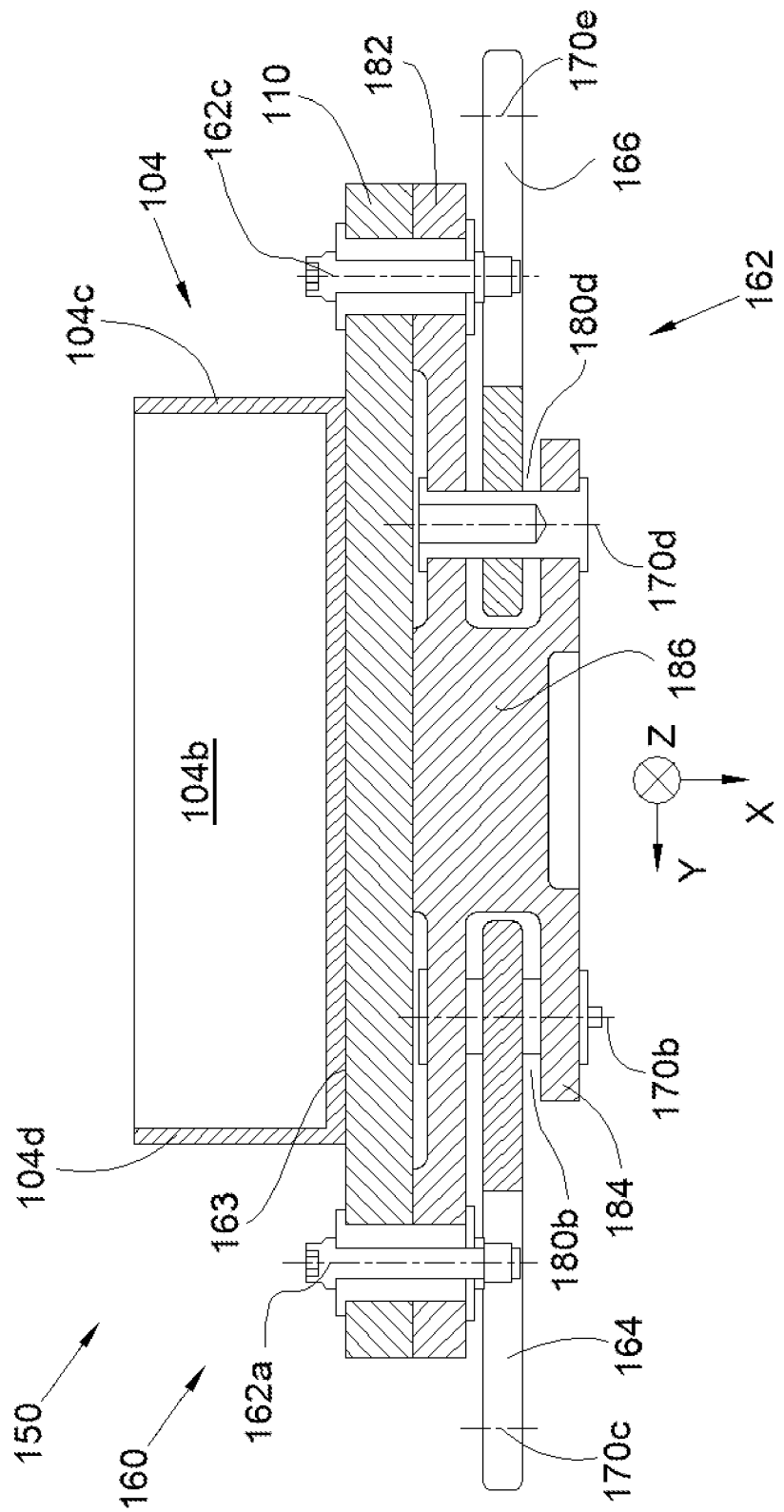
FIG. 4 is a view in section of the front engine attachment system in FIG. 2 along the line IV-IV.
Figure 5:
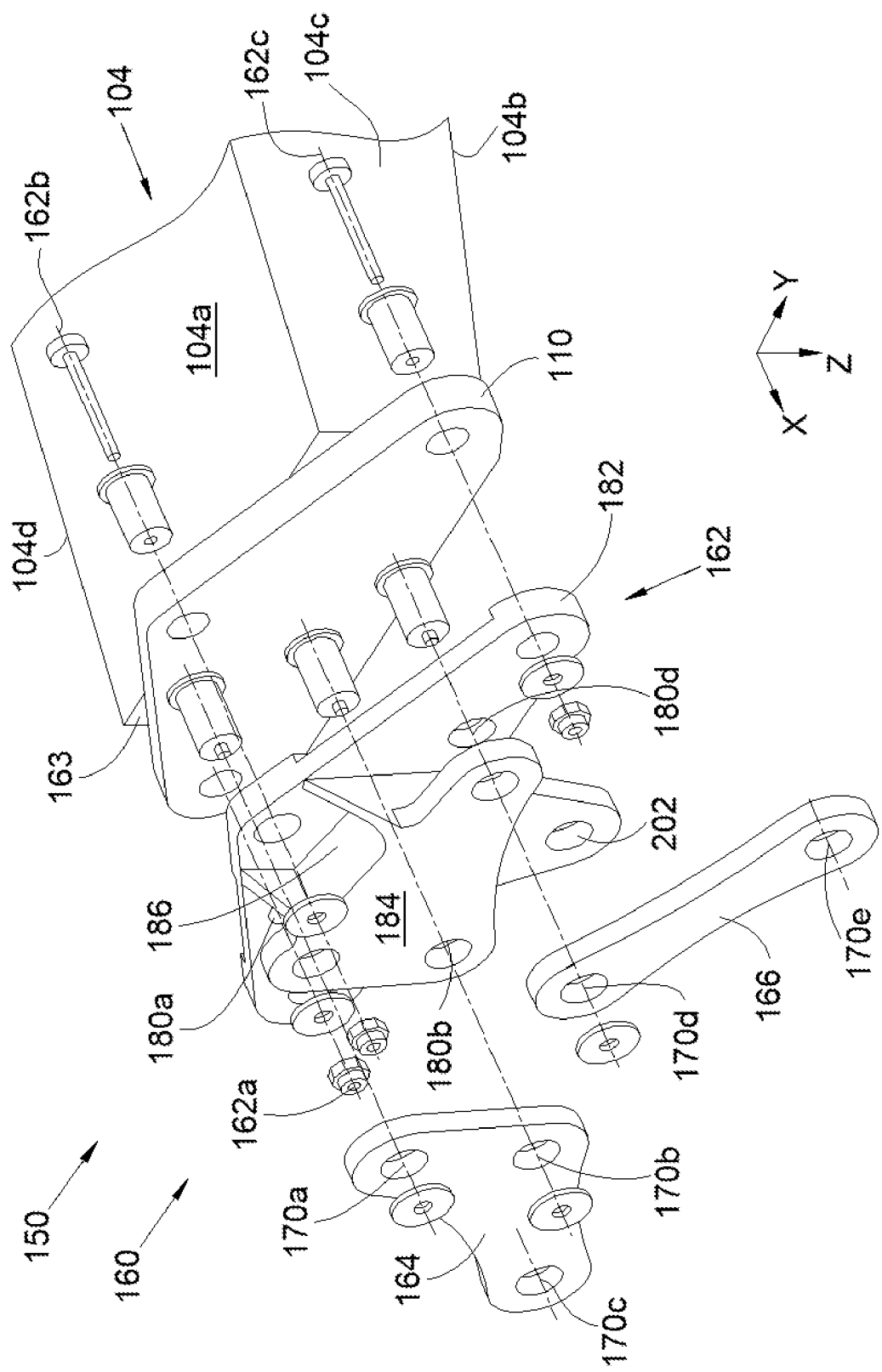
FIG. 5 is an exploded perspective view of the front engine attachment system in FIG. 2.
Figure 6:
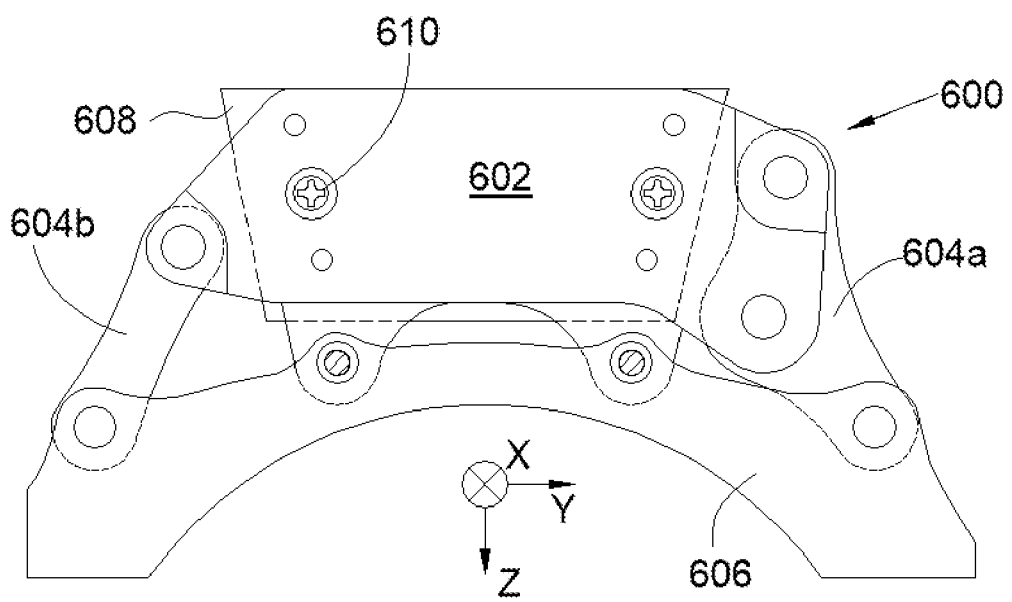
FIG. 6 is a front view of a front engine attachment system of the prior art.

FIG. 2 shows a front engine attachment system 150 that is fastened to the structure of the aircraft 100, in this case of the wing 106, and extends beneath the wing 106 and supports the engine 102 and in particular the front part of the engine 102. FIGS. 3 to 5 show different views of the front engine attachment system 150.

The front engine attachment system 150 comprises the engine pylon 104, which is fastened to the structure of the wing 106, and a front engine attachment 160, which is fastened between the engine pylon 104 and a front casing 103 as one with the engine 102.

Conventionally, a rear engine attachment is fastened between the engine pylon 104 and a rear part of the engine 102 and it can take any form known to those skilled in the art.

In a known manner, the engine pylon 104 takes the form of a box that has, inter alia, in its front part, a frontal rib 110 that extends in a substantially vertical plane perpendicular to the longitudinal direction X.

The engine pylon 104 has an upper wall 104a, lower wall 104b and two lateral walls 104c-d. The various walls 104a-d are as one with one another so as to form a box of which the vertical section is generally trapezoidal. The frontal rib 110 is fastened against a front face 163 by any known means such as for example by welding. The front face 163 corresponds to the front ends of the walls 104a-d and takes the general shape of a trapezium delimited by the walls 104a-d.

The front engine attachment 160 has a beam 162 fastened to the front of the frontal rib 110 via three fastening points 162a-c. Each fastening point 162a-c is realized in this case by a clamping bolt that grips the frontal rib 110 and the beam 162 and that passes through a bearing passing through bores provided for this purpose in the frontal rib 110 and the beam 162.

The front engine attachment 160 also has a first rod 164. The first rod 164 is fastened in an articulated manner to the beam 162 via two connection points 170a-b and in an articulated manner to the front casing 103 via a third connection point 170c.

The front engine attachment 160 also has a second rod 166, of which a first end is fastened in an articulated manner to the beam 162 via a connection point 170d and of which a second end is fastened in an articulated manner to the front casing 103 via a connection point 170e.

At each connection point 170a-e, the fastening is ensured by fastening elements known to those skilled in the art that are inserted in this case into bores in the beam 162 or in the front casing 103 and the bore in said rod 164, 166.

In particular, each connection point 170a-e takes the form of a pivot connection about a pivot axis generally parallel to the longitudinal direction X.

In the embodiment of the invention that is presented here, for each point 170c 170e of connection of a rod 164, 166 to the front casing 103, the latter has a female clevis in which the rod 164, 166 is positioned.

In the embodiment of the invention that is presented here, for each point 170a-b, 170d of connection of a rod 164, 166 to the beam 162, the latter has a female clevis 180a-b, 180d in which the rod 164, 166 is positioned.

Each point 170a-b, 170d of connection of a rod 164, 166 to the beam 162, i.e., in this case the axis of each female clevis 180a-b, 180d of the beam 162, is positioned inside a volume that extends the front face 163 of the engine pylon 104 towards the front generally in the longitudinal direction X. As is shown in FIG. 2 in which the edges of the front face 163 are depicted in part by unbroken lines and in part by dashed lines, the female devises 180a-b, 180d are all inside the volume that is delimited by said edges and is situated in front of the frontal rib 110.

As a result of this arrangement, the front engine attachment 160 is more compact and its bulk is therefore reduced, and this makes it possible to put cowls in place that surround the front engine attachment 160 that have smaller dimensions relative to the prior art and therefore have reduced drag.

In the embodiment of the invention that is presented here, for each connection point 170a-b, 170d associated with the beam 162, the fastening elements have, inter alia, a bearing that is housed in a bore in the rod 164, 166 and in two bores in the associated female clevis 180a-b, 180d.

FIG. 2 shows the distribution of the forces in normal operation of the front engine attachment 160.

For safety reasons, the front engine attachment system 150 also has an additional connection point 202 between the beam 162 and the front casing 103 that constitutes a backup safety connection point (or "waiting fail-safe") that will compensate a failure of the primary force path, i.e., of at least one of the rods 164, 166. The additional connection point 202 is disposed between the points 170c and 170e of connection of the rods 164 and 166 with the front casing 103.

In the same way, one of the fastening points 162b between the beam 162 and the frontal rib 110 constitutes a backup safety fastening point (or "waiting fail-safe") that will compensate a failure of the primary force path, i.e., of at least one of the other two fastening points 162a, 162c.

The beam 162 is made up of a main plate 182, a secondary plate 184 parallel to the main plate 182 and a block 186 forming a spacer between the main plate 182 and the secondary plate 184.

The main plate 182 is pressed against the frontal rib 110, at the front of the latter, and the secondary plate 184 is in front of the main plate 182.

The main plate 182 has passing through it the bores making it possible to create the fastening points 162a-c and the bore making it possible to create the additional connection point 202.

For each female clevis 180a-b, 180d of the beam 162 for putting a rod 164, 166 in place, one of the walls of said female clevis 180a-b, 180d is realized by the main plate 182 and the other wall of said female clevis 180a-b, 180d is realized by the secondary plate 184, and each plate 182, 184 has the corresponding bore passing through it.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A front engine attachment system for an engine of an aircraft, the front engine attachment system comprising:

an engine pylon having a front face and a frontal rib fastened against the front face, a front engine attachment having a beam fastened to a front of the frontal rib, a first rod fastened in an articulated manner to the beam via two connection points and a second rod fastened in an articulated manner to the beam via one connection point, and a front casing of the engine, wherein the first rod is fastened in an articulated manner to the front casing via a connection point and wherein the second rod is fastened in an articulated manner to the front casing via a connection point, wherein each point of connection of a rod to the beam is positioned inside a volume that extends the front face of the engine pylon towards the front, wherein the volume is laterally delimited by a first plane on which a first lateral wall of the pylon lies and a second plane on which a second lateral wall of the pylon lies.

2. The front engine attachment system according to claim 1, for each point of connection of a rod to the beam, the beam has a female clevis in which the rod is positioned.

3. The front engine attachment system according to claim 2, wherein the beam is made up of a main plate, a secondary plate parallel to the main plate and a block forming a spacer between the main plate and the secondary plate, wherein the main plate is pressed against the frontal rib, and wherein, for each female clevis of the beam, one wall of said female clevis is formed by the main plate and another wall of said female clevis is formed by the secondary plate.

4. An aircraft comprising:

a structure, an engine, and a front engine attachment system according to claim 1, wherein the engine pylon is fastened to the structure, and wherein the front casing is as one with the engine.

\* \* \* \* \*